(12) United States Patent
Hashimoto et al.

(10) Patent No.: US 11,224,292 B2
(45) Date of Patent: Jan. 18, 2022

(54) SEAT CORE MATERIAL

(71) Applicant: JSP CORPORATION, Tokyo (JP)

(72) Inventors: Keiichi Hashimoto, Tochigi (JP); Katsunori Hisamatsu, Tochigi (JP); Atsuo Takayama, Tochigi (JP)

(73) Assignee: JSP CORPORATION, Tokyo (JP)

(*) Notice: Subject to any disclaimer, the term of this patent is extended or adjusted under 35 U.S.C. 154(b) by 0 days.

(21) Appl. No.: 16/474,225

(22) PCT Filed: Dec. 27, 2017

(86) PCT No.: PCT/JP2017/046967
§ 371 (c)(1),
(2) Date: Jun. 27, 2019

(87) PCT Pub. No.: WO2018/124201
PCT Pub. Date: Jul. 5, 2018

(65) Prior Publication Data
US 2019/0350365 A1  Nov. 21, 2019

(30) Foreign Application Priority Data
Dec. 28, 2016 (JP) .............................. JP2016-255633

(51) Int. Cl.
*A47C 7/18* (2006.01)
*B60N 2/70* (2006.01)

(52) U.S. Cl.
CPC ................ *A47C 7/185* (2013.01); *B60N 2/70* (2013.01); *B60N 2/7017* (2013.01)

(58) Field of Classification Search
None
See application file for complete search history.

(56) References Cited

U.S. PATENT DOCUMENTS

| | | | |
|---|---|---|---|
| 2002/0003366 A1* | 1/2002 | Fourrey | B60N 2/70 297/284.1 |
| 2005/0060809 A1* | 3/2005 | Rogers | A61G 7/05769 5/713 |
| 2010/0194171 A1* | 8/2010 | Hirata | B60N 2/01508 297/452.48 |
| 2013/0270887 A1* | 10/2013 | Matsumoto | B60N 2/643 297/452.34 |
| 2016/0235206 A1* | 8/2016 | Piretti | A47C 7/44 |
| 2017/0334106 A1* | 11/2017 | Sameshima | B29C 44/445 |
| 2019/0099002 A1* | 4/2019 | Murata | B29C 44/12 |
| 2019/0217759 A1* | 7/2019 | Sakakibara | B60N 2/7017 |

(Continued)

FOREIGN PATENT DOCUMENTS

| | | |
|---|---|---|
| JP | 2015-174340 | 10/2015 |
| JP | 2018-29655 | 3/2018 |

(Continued)

OTHER PUBLICATIONS

International Search Report dated Apr. 3, 2018 in International Application No. PCT/JP2017/046967.

*Primary Examiner* — David E Allred
(74) *Attorney, Agent, or Firm* — Wenderoth, Lind & Ponack, L.L.P.

(57) ABSTRACT

A seat core material having reduced deformation, extremely excellent dimensional accuracy, sense of unity, and strength is thus provided. The frame member and the foamed particle molding are integrated in the seat core material.

12 Claims, 5 Drawing Sheets

(56) References Cited

U.S. PATENT DOCUMENTS

| | | | | |
|---|---|---|---|---|
| 2020/0001760 A1* | 1/2020 | Hashimoto | ............. | B29C 44/34 |
| 2020/0062157 A1* | 2/2020 | Takayama | ................ | A47C 7/20 |
| 2020/0238870 A1* | 7/2020 | Takayama | ............. | B60N 2/015 |

FOREIGN PATENT DOCUMENTS

| JP | 2018-30391 | | 3/2018 |
|---|---|---|---|
| JP | 2018187270 A | * | 11/2018 |
| WO | 2016/152530 | | 9/2016 |

\* cited by examiner

FIG. 5

SEAT CORE MATERIAL

TECHNICAL FIELD

The present invention relates to a seat core material for a seat of a car.

BACKGROUND ART

A seat core material has been recently used in a seat of a car. In the seat core material, a foamed particle molding and a frame member are integrated by burying the frame member including metal or any other material in the foamed particle molding. The frame member is buried in the foamed particle molding as, for example, a member for mounting to a vehicle body or a reinforcing member for collision.

For example, the seat core material having the frame member buried in the foamed particle molding is manufactured as follows. First, the frame member is disposed at a predetermined position in a mold. The mold is then filled with foamed particles. The foamed particles in the mold are heated, and fused to each other. The seat core material is integrally molded in the mold.

It should be noted that a foamed particle molding is usually subject to molding shrinkage after molding in a mold and the shape of the foamed particle molding is thus stabilized with a dimension shrinked from the dimension of the mold.

When the foamed particle molding having such a shrinkage property and the frame member are integrally molded, shrinkage of the foamed particle molding causes deformation of the frame member and warpage of the seat core material mainly owing to the difference between the shrinkage rate of the foamed particle molding and that of the frame member. There arise problems that, for example, the target dimensional accuracy of the seat core material cannot be obtained and the accuracy in mounting the seat core material to a vehicle is reduced.

In order to solve these problems in the seat core material for a seat of a car, there is proposed a method of stabilizing the dimension. In the method, pieces of divided space are provided in a foamed particle molding such that a frame member is exposed, and the foamed particle moldings are independently shrunk by the pieces of divided space (e.g., see Patent Literature 1).

CITATION LIST

Patent Literature

Patent Literature 1: WO 2016/152530

SUMMARY OF INVENTION

Technical Problem

According to the proposition of the above-described Patent Literature 1, the foamed particle molding has a completely divided structure. Each of the foamed particle moldings having the divided structure can independently shrink. Unfortunately, the seat core material of the above-described Patent Literature 1 lacks overall sense of unity, and the seat core material is bent or deformed in handling. No consideration is given to shrinkage of the foamed particle molding in a front-back direction in a seat core material having large difference between a seat thickness at the front and that at a rear portion.

The invention is made to solve the above-described problems, and the object thereof is to provide a seat core material having reduced deformation, extremely excellent dimensional accuracy, sense of unity, and strength even when a frame member is buried in and integrated with a foamed particle molding.

Solution to Problem

The invention provides the seat core material described below.

<1> A seat core material including: a thermoplastic resin foamed particle molding; and a frame member buried in a peripheral edge of the foamed particle molding, in which the frame member is an annular frame including a front frame part, a rear frame part, and two side frame parts that connect the front frame part and the rear frame part to each other, the foamed particle molding includes a first slit continuously formed over a width direction of the foamed particle molding between the side frame parts, the first slit penetrating the foamed particle molding from an upper surface to a lower surface, and the foamed particle molding includes a connection in a part of the foamed particle molding outside both ends of the first slit in a width direction, a first slit being not formed in the connection, and a ratio (l/L) of a length (l) of the connection in a width direction to a length (L) of the foamed particle molding in the width direction at a portion where the connection is positioned is 0.02 to 0.2 on one side.

<2> The seat core material according to <1>, in which the connection is positioned in a range of the foamed particle molding from a central portion in a front-back direction to the rear frame part.

<3> The seat core material according to <1> or <2>, in which a penetration direction of the first slit is tilted to a vertical direction in attachment of the seat core material.

<4> The seat core material according to any one of <1> to <3>, in which a ratio of an opening area of the first slit to a projected area of the foamed particle molding in an upper surface view in attachment of the seat core material is 15% or less.

<5> The seat core material according to any one of <1> to <4>, in which the foamed particle molding includes a second slit along a side frame part at an adjacent position inside the side frame part from an upper surface of the foamed particle molding in a thickness direction of the foamed particle molding.

<6> The seat core material according to any one of <1> to <5>, in which the first slit is linearly formed over a width direction of the seat core material.

Advantageous Effects of Invention

A seat core material of the invention has extremely excellent dimensional accuracy, and sense of unity and strength as a seat core material even when a frame member is buried in and integrated with a foamed particle molding.

DESCRIPTION OF EMBODIMENTS

Figure 1:
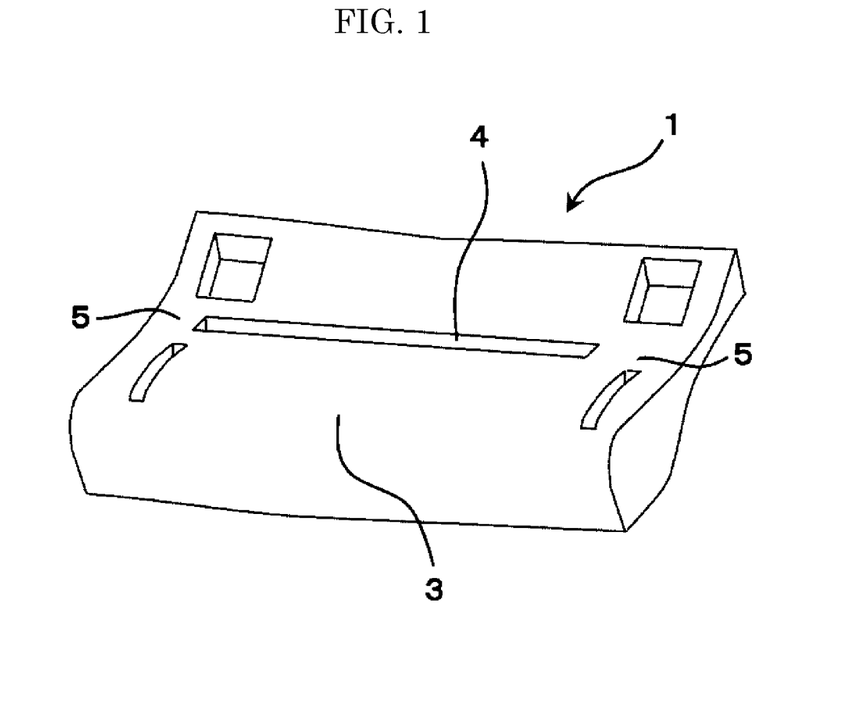
FIG. 1 is a schematic perspective view illustrating one embodiment of a seat core material of the invention.
Figure 2:
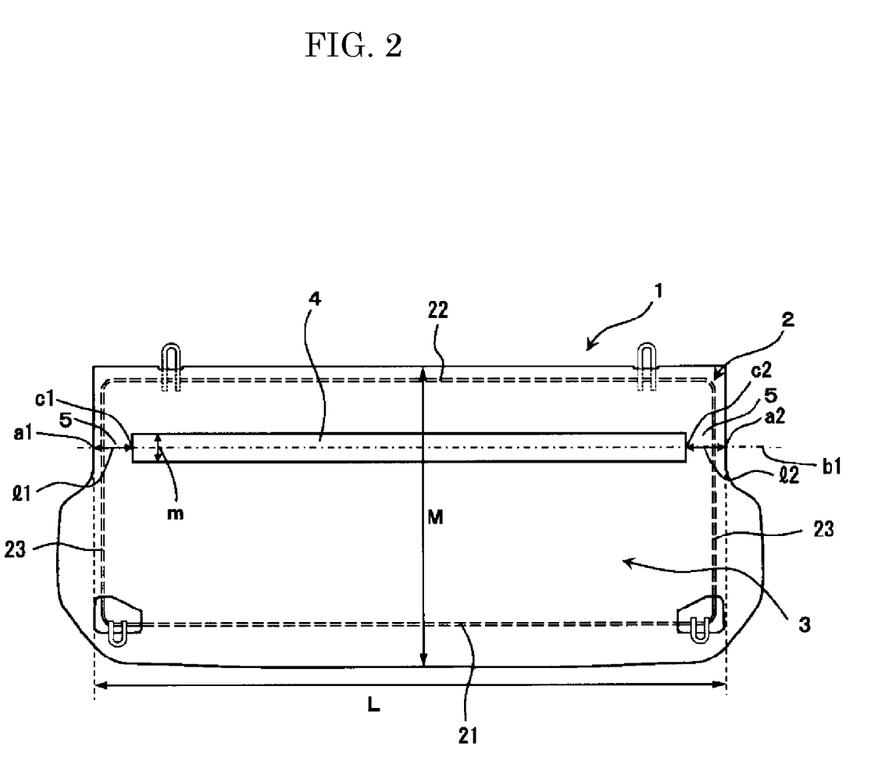
FIG. 2 is a schematic view illustrating one embodiment of the seat core material of the invention.

A seat core material of the invention will be described in detail below with reference to the drawings. FIGS. 1 and 2 are schematic views illustrating one embodiment of the seat core material of the invention.

A seat core material 1 of the invention includes a foamed particle molding 3 and a frame member 2 buried in a peripheral edge of the foamed particle molding 3. The frame member 2 is an annular type frame including a front frame part 21, a rear frame part 22, and two of right and left side frame parts 23. The side frame parts 23 connect the front frame part 21 and the rear frame part 22 to each other. A first slit 4 is continuously formed over a width direction of the foamed particle molding 3 in the foamed particle molding 3 between the right and left side frame parts 23. The first slit 4 penetrates the foamed particle molding 3 from the upper surface to the lower surface. A connection 5 is left outside both ends of the first slit 4 in the width direction.

The foamed particle molding 3 can be formed of thermoplastic resin. Examples of the thermoplastic resin for the foamed particle molding 3 include polystyrene resin, polyolefin resin such as polyethylene resin and polypropylene resin, polyester resin such as polybutylene succinate, polyethylene terephthalate, and polylactic acid, and polycarbonate resin. The examples also include composite resin of polystyrene resin and polyolefin resin and a mixture of two or more kinds of the above-described resins. Polyolefin resin and composite resin of polystyrene resin and polyolefin resin are preferred of these resins in terms of lightweight property and strength. Polyethylene resin and polypropylene resin are preferred of these resins, and polypropylene resin is more preferred. The foamed particle molding 3 including thermoplastic resin containing crystalline resin such as polyethylene and polypropylene has a large shrinkage rate after molding. Effects of the invention can thus be easily obtained.

The foamed particle molding 3 is formed by in-mold molding of foamed particles of the above-described thermoplastic resin. The foamed particles can be manufactured by a usually known method for manufacturing this kind of foamed particle. For example, polypropylene resin foamed particles are manufactured by a method of obtaining foamed particles. In the method, resin particles are dispersed while a surfactant is added if desired in a required amount of dispersion medium (usually water) in a pressurizable sealed container such as an autoclave. The resin particles are stirred while heated. A foaming agent is injected and the resin particles are impregnated with the foaming agent. After a predetermined time period, the resin particles impregnated with the foaming agent are discharged together with the dispersion medium from the inside of the container under a condition of high temperature and high pressure to a low pressure region (usually under the atmospheric pressure). The resin particles are foamed.

The foamed particle molding 3 preferably has an apparent density of 0.015 to 0.3 g/cm$^3$. In order to form the seat core material 1 having excellent strength and lightweight property, the lower limit of the apparent density of the foamed particle molding 3 is more preferably 0.025 g/cm$^3$, and further preferably 0.03 g/cm$^3$. The upper limit of the apparent density of the foamed particle molding 3 is more preferably 0.1 g/cm$^3$, and further preferably 0.08 g/cm$^3$. The lower limit of the apparent density of the foamed particle molding 3 including polyolefin resin is preferably 0.018 g/cm$^3$, and further preferably 0.020 g/cm$^3$. The upper limit of the apparent density of the foamed particle molding 3 including polyolefin resin is preferably 0.07 g/cm$^3$, and further preferably 0.06 g/cm$^3$. It should be noted that the foamed particle molding 3 having a lower apparent density tends to shrink more greatly, and the effects of the invention are easily exhibited. A plurality of foamed particle moldings 3 having different apparent densities can be combined to form one foamed particle molding 3. In this case, the average apparent density of the entire foamed particle molding 3 is required to be within the above-described numerical range. It should be noted that the apparent density here can be determined by a submergence method in which the foamed particle molding 3 is submerged for measurement.

Examples of material of the frame member 2 include metal, such as iron, aluminum, and copper, and resin. In order to improve the strength of the seat core material 1, the frame member 2 is preferably made of metal, and particularly preferably made of steel. The frame member 2 can have any shape such as a linear shape, a tubular shape, and a rod shape. A rod-shaped or linear wire material having a diameter of 2 to 8 mm is preferably used among these shapes. The wire material more preferably has a diameter of 3 to 7 mm.

The wire material preferably has a tensile strength of 200 N/mm$^2$ or more. In order to improve the strength of the seat core material 1, the wire material more preferably has a tensile strength of 250 to 1300 N/mm$^2$. The wire material preferably has a yield point of 400 N/mm$^2$ or more, and further preferably 440 N/mm$^2$. It should be noted that the physical property of the wire material can be measured based on JIS G3532. The frame member 2 can be annularly formed by welding or bending the above-described material.

It should be noted that the annular frame member 2 not necessarily needs to be formed by wire only. For example, the annular frame member 2 may be formed by connecting wires with, for example, a metal plate. A part such as a hook part to be used for fixation to a vehicle may be coupled to the plate part as necessary.

The frame member 2 is integrally buried in the foamed particle molding 3, and used for improving the strength of the seat core material 1 or attaching the seat core material 1 to a vehicle body. As illustrated in FIG. 2, the seat core material 1 of the invention includes an annular frame buried in a foamed particle molding. The annular frame includes the front frame part 21, the rear frame part 22, and the right and left side frame parts 23. The side frame parts 23 connect the front frame part 21 and the rear frame part 22 to each other.

It should be noted that the above-described "buried" means that the frame member 2 is integrated in a foamed particle molding as follows. For example, there is contained not only a case where the foamed particle molding 3 surrounds the frame member 2 in close contact but a case where the foamed particle molding 3 surrounds the frame member 2 via a gap (or space) partially or entirely formed around the frame member 2. The entire length of the frame member 2 in the axial direction does not need to be buried in the foamed particle molding 3. For example, as illustrated in FIG. 2, a part of the annular frame member 2 may be exposed out of the foamed particle molding 3. It should be noted that, in terms of the strength of the seat core material 1, an exposed part (part exposed out of the foamed particle molding 3) of the annular frame member 2 is preferably equal to or less than 30% of the entire length of the frame member 2.

It should be noted that, when the movement of the frame member 2 is restricted by the foamed particle molding 3 in a direction substantially vertical to both of a shrinkage direction of the foamed particle molding 3 and an axial direction of the frame member 2, the frame member 2 buried in the foamed particle molding 3 is preferably buried such that the frame member 2 can move in response to shrinkage of the foamed particle molding 3. For example, when shrinkage force of the foamed particle molding 3 against the frame member 2 is mainly in the width direction of the seat core material, the frame member 2 is preferably buried in the foamed particle molding 3 with the frame member 2 clamped by the foamed particle molding 3 at a position facing the vertical direction of the frame member 2. More specifically, the frame member 2 is preferably supported by the foamed particle molding 3 in the up-down direction. The side frame part 23 is preferably supported by the foamed particle molding 3 in the up-down direction.

Here, the front frame part 21 of the frame member 2 means a part of the frame member 2. The part corresponds to a seat front part of car front in the state where the seat core material 1 is attached in a body of a vehicle. The rear frame part 22 means a part, which corresponds to a seat rear part, of the frame member 2. The width direction means the right-left direction of a car in the state where the seat core material 1 is attached in the body of the vehicle.

The seat core material 1 of the invention has the first slit 4 formed over the width direction in a part of the foamed particle molding between the side frame parts 23 of the seat core material 1. The first slit 4 penetrates the foamed particle molding 3 from the upper surface to the lower surface. The seat core material 1 having a shape of thick front part and thin rear part as illustrated in FIG. 1 usually has a shrinkage amount of a sitting part on the side of the front frame part 21 greater than that of the sitting part on the side of the rear frame part 22. The sitting part on the side of the front frame part 21 has a relatively large volume of the foamed particle molding 3. The front frame part 21 is buried biased to the lower-surface side of the seat core material 1. This causes the foamed particle molding 3 on the side of the rear frame part 22 to be pulled along with shrinkage of the foamed particle molding 3 on the side of the front frame part 21 after removal of the seat core material 1 from a mold, and the seat core material 1 to be entirely deformed in a V-shape. For example, in the rear frame part 22, the foamed particle molding on the end-sides in the width direction is deformed forward, and the foamed particle molding on the central portion is deformed forward more greatly than on the sides. The seat core material is thus deformed in the V-shape as a whole in an upper surface view. When the frame member 2 is buried at a biased position in the thickness direction in the thick front frame part 21, the direction of shrinkage is three-dimensional, leading to further complication. In contrast, according to the seat core material 1 of the invention, shrinkage force applied to the foamed particle molding 3 after molding of the seat core material 1 having a shape of thick front part and thin rear part can be mitigated by forming the first slit 4 in the foamed particle molding 3 between the side frame parts 23. The first slit 4 can effectively inhibit deformation of the seat core material 1, and enable the seat core material 1 having excellent dimensional stability together with strength and sense of unity.

Although the length (m) of the first slit 4 in the direction (front-back direction) of the side frame part 23 is not particularly limited, the first slit 4 has a lower limit of the length (m) in the front-back direction. The lower limit corresponds to a length in a shape obtained by simply making a cut in the foamed particle molding. In contrast, the upper limit of the length (m) of the first slit 4 in the front-back direction is approximately 60 mm. In terms of the strength of the seat core material 1, the length (m) is preferably 5 to 50 mm.

The first slit 4 can be formed with a tool such as a cutter before the start of shrinkage immediately after in-mold molding of foamed particles. The first slit 4 may be formed at the same time as the foamed particle molding 3 is molded by using a molding mold having a shape in which the first slit 4 is formed. When the first slit 4 is formed with a molding mold, the lower limit of the length (m) of the first slit 4 in the front-back direction is preferably 3 mm, and more preferably 5 mm. The upper limit of the length (m) of the first slit 4 in the front-back direction is preferably 40 mm, and more preferably 30 mm.

Figure 4:
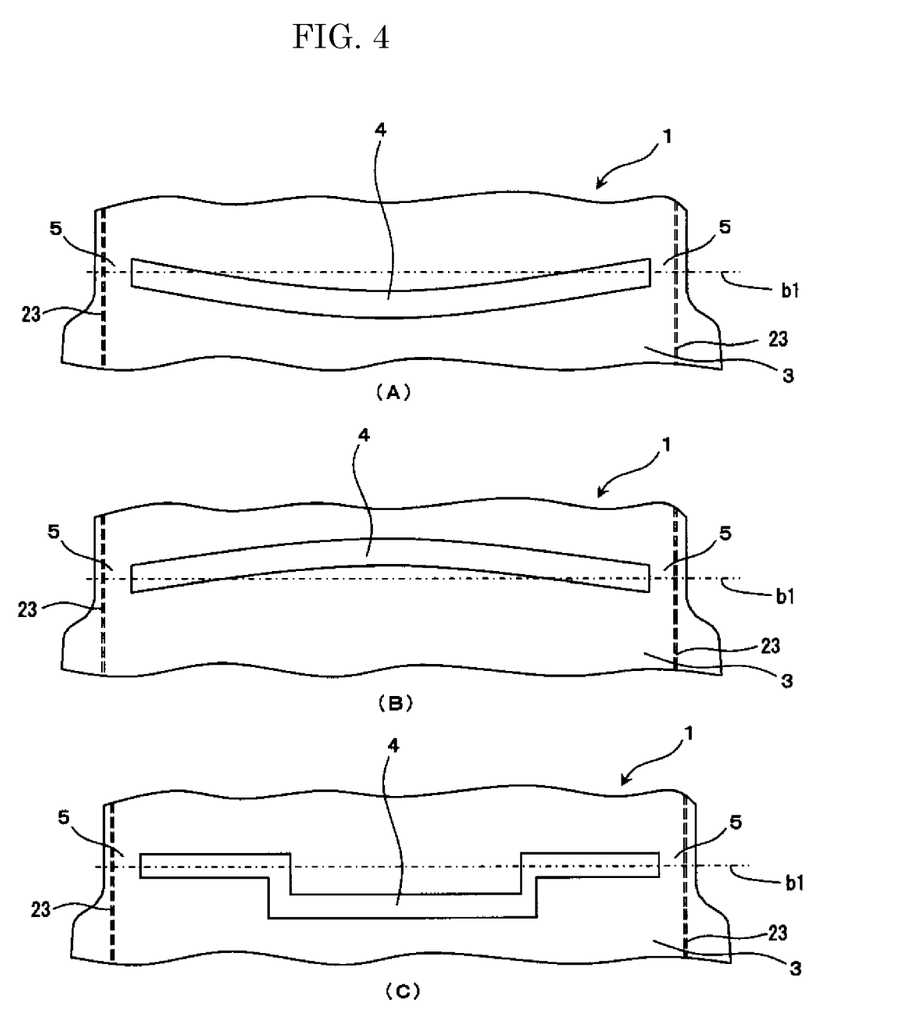
FIG. 4 is a schematic view illustrating the shape of the first slit, the first slit being bent toward a front side in (A), the first slit being bent toward a rear side in (B), the first slit having a crank in (C).

The shape of the first slit 4 can be appropriately set in accordance with the shape of the seat core material 1. For example, the first slit 4 may have a linear shape continuous in the width direction as illustrated in FIG. 2 in the upper surface view of the seat core material 1. The first slit 4 may have a curved shape in which an arc is drawn toward the front side or the rear side as illustrated in FIGS. 4(A) and 4(B). The first slit 4 may have a shape with a crank as illustrated in FIG. 4(C). Formation of the above-described entirely continuous first slit 4 can further reduce the deformation amount of the seat core material 1.

Figure 3:
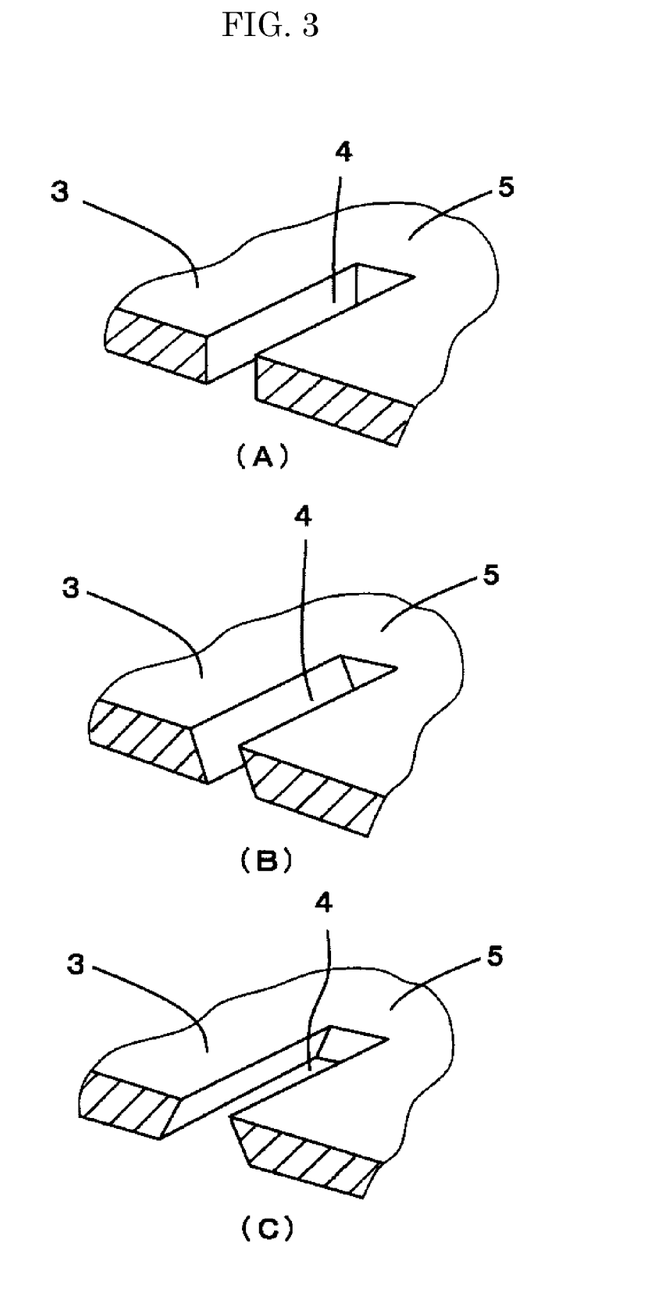
FIG. 3 is a cross-sectional view illustrating the cross-sectional shape of a first slit, the first slit being provided vertically to the vertical direction in attachment of the seat core material and having a cross-sectional shape of square in (A), the first slit having a cross-sectional shape of parallelogram in (B), the first slit having a cross-sectional shape of trapezoid in (C).

The first slit 4 can be formed such that the penetration direction of the first slit 4 is vertical to the vertical direction in attachment of the seat core material 1 as illustrated in FIG. 3(A). The first slit 4 can also be formed such that the penetration direction of the first slit 4 is tilted to the vertical direction in attachment of the seat core material 1. Specific examples include the first slit 4 of parallelogram as illustrated in FIG. 3(B) and the first slit 4 of trapezoid as illustrated in (C). An opening position or an opening area of the first slit 4 in the upper surface portion of the seat core material 1 can be adjusted by forming the first slit 4 such that the penetration direction of the first slit 4 is tilted to the vertical direction in attachment of the seat core material 1.

In particular, tilting the penetration direction of the first slit 4 and forming front and back side walls of the first slit 4 substantially in parallel give an effect of dispersing force in the up-down direction with respect to shrinkage force or impact force applied in the front-back direction, and thus the seat core material 1 can be more preferably used. It should be noted that the penetration direction of the first slit 4 means a direction in which a center of the first slit 4 in the front-back direction in an opening of the first slit 4 is connected to the upper and lower surfaces.

Here, a space having the first slit 4 between the side frame parts 23 in the invention means a portion inside the side frame parts 23 in the width direction. The space includes a space in the case where, in the portion on which the first slit 4 is formed, the first slit 4 is in contact with the side frame part 23 and at least a part of the side frame part 23 and the foamed particle molding 3 are partially fused to each other. For example, the side frame part 23 may be partially exposed at an end of the first slit 4. Even partial fusion of a part of the side frame part 23 and the foamed particle molding 3 enables the seat core material 1 sufficiently having sense of unity and strength. In contrast, complete crossing of the side frame part 23 and the first slit 4 causes a remarkable decrease in strength around the side frame part 23, leading to difficulty in obtaining the seat core material 1 having excellent sense of unity and strength. In terms of strength of the above-described seat core material 1, the connection 5 is preferably provided between the both ends of the first slit 4 in the width direction and the side frame part 23. The connection 5 is a portion where the first slit 4 is not formed. The part of the foamed particle molding is thus provided between the end of the first slit 4 in the width direction and the side frame part 23.

The ratio of the opening area of the first slit 4 to the projected area of the foamed particle molding 3 in an upper surface view in attachment of the seat core material 1 of the embodiment is preferably 15% or less. The opening area of the first slit 4 in the range enables sufficient prevention of deformation, resulting in the seat core material 1 having further sense of unity and strength. In terms of the above description, the first slit 4 preferably has an opening area of 12% or less, and more preferably 0.4 to 9%.

The ratio (l/L) of the length (l) of the connection 5 in the width direction to the length (L) of a portion, in the width direction, where the connection 5 of the foamed particle molding 3 is positioned is in the range of 0.02 to 0.2 on one side. The connection 5 is a portion, where the first slit 4 is not formed, from an end of the foamed particle molding to an outer end of the first slit 4 in the width direction of the seat core material. The two connections 5, which are portions where the first slit 4 is not formed, are formed on both sides in the width direction in the seat core material 1 in FIG. 2. It should be noted that both the portions are required to satisfy the above-described range.

In the above-described range, the connection 5, which is a portion where the first slit 4 is not formed, is formed at both end portions in the width direction of the seat core material 1, and the seat core material 1 has reduced dimensional change and excellent strength and sense of unity. The above-described ratio (l/L) is more preferably 0.03 to 0.15, and further preferably 0.05 to 0.1.

The ratio (l/L) of the length (l) of the connection 5 in the width direction to the length (L), in the width direction of the seat core material, of a portion where the connection 5 of the foamed particle molding 3 is positioned can be measured as follows. In the case of one long linear first slit 4 as illustrated in FIG. 2, a straight line (b1) is drawn in the width direction of the foamed particle molding at central portions (a1 and a2) in the front-back direction of both outer edge ends of the first slit 4, and the straight line (b1) portion is defined as a first slit-formed portion. The length L of the straight line between both ends (a1 and a2) of the foamed particle molding 3 is measured. Each of the lengths l₁ and l₂ on the straight line from ends (a1 and a2) of the foamed particle molding 3 to both ends (c1 and c2) of the first slit 4 is defined as l, and (l/L) on one side is calculated.

It should be noted that, when the first slit 4 is curved or cranked as illustrated in FIGS. 4 (A) to 4(C), the straight line (b1) orthogonal to the front-back direction of the seat core material 1 in the width direction of the seat core material is drawn so as to pass through the central portions (a1 and a2) in the front-back direction of the first slit 4 at first slit ends on the outer edge side of the seat core material. The lengths L and l on the straight line (b1) are measured. When both ends of the first slit are shifted in the front-back direction, a straight line orthogonal to the front-back direction is drawn in the width direction of the seat core material on the middle point in the front-back direction. When the measurement points (a1, a2, c1, and c2) are not on the straight line (b1), perpendiculars are drawn from the measurement points to the straight line (b1). The lengths L and l are measured on the intersection points.

Although the formation position of the connection 5 is not particularly limited as long as the position is between the side frame parts 23 of the foamed particle molding 3, the connection 5 is preferably formed in the range from a central portion of the foamed particle molding 3 in the front-back direction to the rear frame part 22. Forming the connection 5 in a space from the central portion of the foamed particle molding 3 to the rear frame part 22 enables the first slit 4 to absorb and mitigate shrinkage force on the side of the front frame part 21. A shrinkage amount of the foamed particle molding 3 is relatively large on the side of the front frame part 21. In particular, deformation of the foamed particle molding 3 on the side of the rear frame part 22 can be effectively inhibited. The first slit 4 is preferably provided in a sitting part of the seat core material 1 and in front of a rising part on the rear side.

Specifically, the connection 5 is preferably formed in a portion of 50 to 90% from the end of the foamed particle molding on the front side with respect to a length (M) in the front-back direction at the central portion of the foamed particle molding, and preferably formed in a portion of 60 to 80% from the end of the foamed particle molding on the front side. The first slit 4 formed in the range enables effective mitigation of influence by shrinkage force of the foamed particle molding 3 on the side of the front frame part 21. The foamed particle molding 3 is thick and has a relatively large volume on the side of the front frame part 21. Influence on the strength of the easily deformable rising part on the rear side can also be reduced, and the seat core material 1 can have sense of unity.

Figure 5:
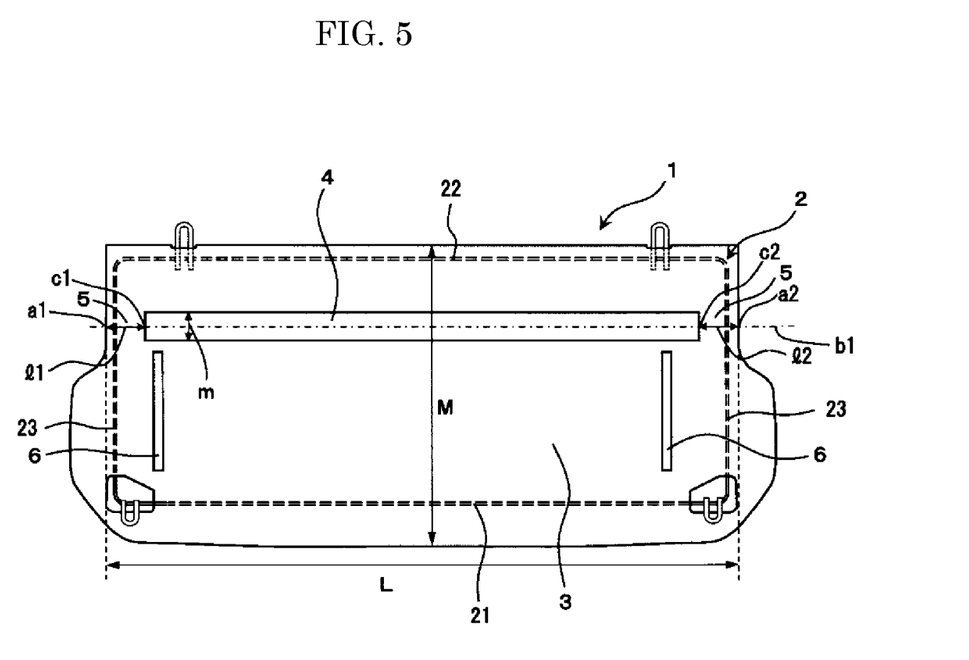
FIG. 5 is a schematic view illustrating an embodiment in which a second slit is formed along a side frame part.

The seat core material 1 of the invention can have a second slit 6. As illustrated in FIG. 5, the second slit 6 is formed along the side frame part 23 in the front-back direction, inside the side frame part 23, in the thickness direction of the molding from the upper surface of the foamed particle molding 3. One or a plurality of second slits 6 may be formed along the side frame part 23. It should be noted that the width (length in the right-left direction) of the cut is preferably 10 to 30 mm. The length of the cut in the front-back direction is preferably 50 to 200 mm.

The cut groove part 6 formed, together with the first slit 4 provided in the width direction, along the side frame part 23 inside the side frame part 23 enables mitigation of shrinkage in the width direction, further inhibition of deformation of the seat core material 1, and thus the seat core material 1 having sense of unity and strength.

A through hole can be formed in a range without decreasing sense of unity and strength, which are objects of the invention, at a location other than that of the first slit 4 or the second slit 6 in the seat core material 1 of the invention. Such a through hole is formed for weight saving or connection with another component.

In order to manufacture the seat core material 1 of the embodiment, the molding mold having a projection for forming the first slit 4 at a position between the side frame parts 23 is used. First, a molding mold is filled with foamed particles that have been primarily foamed with the frame member 2 disposed at a predetermined position in the molding mold. Heated steam is then introduced in the mold to heat and secondarily foam the foamed particles. The surfaces of the foamed particles are melted to mold the foamed particle molding 3 and integrate the foamed particle molding 3 with the frame member 2. Although, in the seat core material 1 of the embodiment formed under a predetermined condition by the above-described in-mold molding, shrinkage of the foamed particle molding 3 is started from the stage of removal from the mold, the first slit 4 formed by the mold mitigates influence of the shrinkage of the foamed particle molding 3 and inhibits deformation.

In addition to the above-described method of forming the first slit 4 in the mold, the first slit 4 can be formed by a method such as cutting. In the method, the seat core material 1 is formed with a traditional mold without a structure for forming the first slit 4 in a mold, and the first slit 4 is formed at an early stage after removal from the mold and before completion of shrinkage.

EXAMPLE

The seat core material of the invention will specifically be described below with reference to examples. The invention, however, is not limited to the examples.

Example 1

An annular loop-like frame member, which has been manufactured with an iron wire material having a diameter of 4.5 mm and a tensile strength (JIS G3532 SWM-B) of 500 N/mm$^2$, was disposed at a predetermined position of a mold (1050 mm in the lateral width direction, 550 mm in the front-back direction, and the maximum thickness of 200 mm (thickness of the front end: 100 mm and thickness of the rear end: 50 mm)) for molding a seat core material for a car seat. The mold was filled with polypropylene foamed particles (apparent density of 0.024 g/cm$^3$). Steam heating and insert molding were performed to obtain a seat core material having the integrally molded frame member.

In the steam heating, preheating (exhaust process) was performed by supplying steam for five seconds into the mold with drain valves on both sides of the mold opened. One-side heating was performed at the pressure 0.08 MPa(G) lower than 0.3 MPa(G) that is molding steam pressure. One-side heating was further performed in the opposite direction at the pressure 0.04 MPa(G) lower than the molding steam pressure. Main heating was performed from both sides at the molding steam pressure. After the completion of the heating, pressure releasing, air cooling for 30 seconds, and water cooling for 240 seconds were performed to obtain the seat core material. It should be noted that the seat core material had a molding density of 0.03 g/cm$^3$.

As illustrated in FIG. 2, a first slit was formed with a utility knife at a position, 360 mm from an end of a front part and 140 mm from an end in a width direction, in a foamed particle molding between side frame parts. The formation was performed within ten minutes after the molding. The first slit had a length of 860 mm in the seat-width direction and a length of 10 mm in the front-back direction of the first slit. It should be noted that the seat core material was then rested for 12 hours under an atmosphere at 60° C. and slowly cooled, whereby a product was obtained.

Example 2

A seat core material was formed in a manner similar to that in the example 1. As illustrated in FIG. 2, one rectangular first slit was formed with a utility knife at a position, 360 mm from a front part and 50 mm from an end in a width direction, in a foamed particle molding between side frame parts. The formation was performed within ten minutes after the molding. The first slit had a length of 950 mm in the seat-width direction and a length of 50 mm in the front-back direction of the first slit.

Comparative Example 1

A seat core material was formed in a manner similar to that in the example 1. No first slit was performed in the formed seat core material.

Comparative Example 2

A seat core material was formed in a manner similar to that in the example 1. Two rectangular first slits, one on the right and the other on the left, were formed with a utility knife at a position, 400 mm from a front part, in a foamed particle molding between side frame parts. The formation was performed in 15 minutes after the molding. The first slit had a length of 250 mm in the seat-width direction and a length of 10 mm in the front-back direction of the first slit.

Comparative Example 3

A seat core material was formed in a manner similar to that in the example 1. A rectangular first slit was formed with a utility knife at a position, 360 mm from a front part and 140 mm from an end in a width direction, so as to cross space between side frame parts. The formation was performed in 15 minutes after the molding. The first slit had a length of 1050 mm in the seat-width direction and a length of 10 mm in the front-back direction of the first slit. It should be noted that the seat core material was completely divided by the first slit.

The seat core materials manufactured under the above-described conditions in the examples 1 and 2 and the comparative examples 1 to 3 were rested for 12 hours under an atmosphere at 60° C. and slowly cooled. A dimensional change amount at a central portion of the seat core material at a rear side and those at both ends of the seat core material at the rear side were measured. It should be noted that the dimensional change amount (mm) were measured defining a forward dimensional change of a measurement position as minus and backward dimensional change as plus. Difference between the dimensional change amounts (dimensional change amount at the central portion—dimensional change amounts at both ends) was defined as a deformation amount. It should be noted that a design dimension of the seat core material at the measurement position was defined as a reference of the dimensional change amount. A large deformation amount means a large difference between the dimensional change amounts at the ends of the seat core material at the rear side and that at the central portion, thus indicating large distortion.

Sense of unity was evaluated by the following references in samples. The samples were obtained by resting the seat core materials, which are manufactured under the above-described conditions in the examples 1 and 2, and the comparative examples 1 to 3, for 12 hours under an atmosphere at 60° C. and slowly cooled.

○: No defects happen in handling even when only an end side of a seat core material is held.

x: The seat core material is bent when the end side of the seat core material is held.

Table 1 indicates the above-described conditions, measurement results, and evaluation results.

TABLE 1

| | Example 1 | Example 2 | Comparative example 1 | Comparative example 2 | Comparative example 3 |
|---|---|---|---|---|---|
| Length (mm) of first slit in width direction | 860 | 950 | 0 | 250 + 250 | 1050 |
| Length (mm) of first slit in front-back direction | 10 | 50 | 0 | 10 | 10 |
| Number of first slit | 1 | 1 | 0 | 2 | 1 |
| Ratio (l/L) | 0.06 | 0.05 | — | 0.25 | — |
| First slit-formed position | 65% | 65% | — | 73% | 65% |
| Opening area | 1.5% | 8.2% | — | 0.9% | 1.8% |
| Deformation amount (mm) | −1 | −1 | −8 | −6 | −1 |
| evaluation for sense of unity | ○ | ○ | ○ | ○ | X |

The results of Table 1 indicate that the deformation amount of seat core material having a first slit in the example 1 or 2 is smaller than that in the comparative examples 1 and 2.

It should be noted that, in the comparative example 2, the first slit does not satisfy the ratio l/L, cannot mitigate shrinkage of a foamed particle molding, and has a large deformation amount and poor accuracy in mounting to a car body. In the comparative example 3, the seat core material has a small deformation amount, but lacks sense of unity.

These results allow the confirmation that the seat core material of the invention has excellent dimensional accuracy with which deformation in a front-back direction is inhibited.

The invention claimed is:

1. A seat core material comprising:
a thermoplastic resin foamed particle molding and a frame member buried in a peripheral edge of the foamed particle molding,
wherein the frame member is an annular frame including a front frame part, a rear frame part, and two side frame parts that connect the front frame part and the rear frame part to each other,
the foamed particle molding includes one lengthwise side-to-side and only one slit that does not include plural slits, the side-to-side slit extending continuously from one end of the side-to-side slit at one of the side frame parts to another end of the side-to-side slit at another of the side frame parts over a width direction of the foamed particle molding between the side frame parts, the side-to-side slit penetrating the foamed particle molding from an upper surface to a lower surface,
an upper limit of a dimension of the side-to-side slit in the front-back direction is 60 mm,
a ratio of an opening area of the side-to-side slit to a projection area of the foamed particle molding in an upper surface view of the seat core material is 15% or less,
the foamed particle molding includes a connection in a part of the foamed particle molding laterally outside both ends of the side-to-side slit in the width direction, the side-to-side slit being not formed in the connection,
the connection is positioned in a range of the foamed particle molding from a central portion in a front-back direction to the rear frame part, and
a ratio (l/L) of a length (l) of the connection in a width direction to a length (L) of the foamed particle molding in the width direction at a portion where the connection is positioned is 0.02 to 0.2 on one side.

2. The seat core material according to claim 1, wherein a penetration direction of the side-to-side slit is tilted relative to a vertical direction of the seat core material, wherein the frame defines a horizontal plane.

3. The seat core material according to claim 1, wherein the foamed particle molding further includes a lengthwise front-to-rear slit along a side frame part at an adjacent position inside the side frame part, the front-to-rear slit from an upper surface of the foamed particle molding in a thickness direction of the foamed particle molding.

4. The seat core material according to claim 1, wherein the side-to-side slit is linearly formed over a width direction of the seat core material.

5. The seat core material according to claim 1, wherein the connection is formed in a portion of 60 to 80% from an end of the foamed particle molding on a front side.

6. The seat core material according to claim 1, wherein the front frame part is buried biased to a lower-surface side of the seat core material.

7. The seat core material according to claim 1, wherein the dimension of the side-to-side slit in the front-back direction is 5 to 50 mm.

8. The seat core material according to claim 1, wherein the thermoplastic resin of the thermoplastic resin foamed particle molding is polyolefin resin.

9. The seat core material according to claim 1, wherein an apparent density of the foamed particle molding is 0.015 to 0.3 g/cm$^3$.

10. The seat core material according to claim 1, wherein at least a portion of the annular frame is integrally buried in the foamed particle molding.

11. The seat core material according to claim 10, wherein a length of an exposed part of the annular frame is equal to or less than 30% of an entire length of the annular frame.

12. The seat core material according to claim 1, wherein the formation position of the connection is in front of a rising part on a rear side.

* * * * *